ABC

(12) United States Patent
Gupta

(10) Patent No.: US 8,365,154 B2
(45) Date of Patent: Jan. 29, 2013

(54) MULTI-LANGUAGE SOFTWARE DEVELOPMENT

(75) Inventor: Manvendra Gupta, Brampton (CA)

(73) Assignee: International Business Machines Corporation, Armonk, NY (US)

(*) Notice: Subject to any disclaimer, the term of this patent is extended or adjusted under 35 U.S.C. 154(b) by 298 days.

(21) Appl. No.: 12/790,718

(22) Filed: May 28, 2010

(65) Prior Publication Data

US 2010/0306734 A1    Dec. 2, 2010

(30) Foreign Application Priority Data

May 29, 2009   (EP) .................................... 09161484

(51) Int. Cl.
*G06F 9/45* (2006.01)
(52) U.S. Cl. ........................ 717/140; 717/137; 717/148
(58) Field of Classification Search ........................ None
See application file for complete search history.

(56) References Cited

U.S. PATENT DOCUMENTS

| 6,066,181 | A  | * | 5/2000  | DeMaster ...................... 717/148 |
| 6,321,190 | B1 | * | 11/2001 | Bernardes et al. ................. 704/8 |
| 7,194,735 | B2 | * | 3/2007  | Barclay .......................... 717/148 |
| 7,222,138 | B2 | * | 5/2007  | Fomenko ............................... 1/1 |
| 7,296,272 | B2 | * | 11/2007 | Kyriakides et al. ............ 719/314 |
| 7,346,897 | B2 |   | 3/2008  | Vargas |
| 7,350,197 | B2 | * | 3/2008  | Savov ........................... 717/137 |
| 7,359,990 | B2 | * | 4/2008  | Munir et al. ................... 709/246 |
| 7,415,701 | B2 | * | 8/2008  | Wang et al. .................... 717/148 |
| 7,441,238 | B2 | * | 10/2008 | Zatloukal ....................... 717/140 |
| 7,954,094 | B2 | * | 5/2011  | Cascaval et al. ............... 717/140 |
| 2004/0168160 | A1 | * | 8/2004  | Zatloukal ....................... 717/140 |
| 2005/0044537 | A1 | * | 2/2005  | Zatloukal ....................... 717/140 |
| 2008/0216060 | A1 | * | 9/2008  | Vargas ........................... 717/137 |
| 2009/0164173 | A1 | * | 6/2009  | Gupta ............................ 702/186 |
| 2009/0271771 | A1 | * | 10/2009 | Fallows ......................... 717/137 |

OTHER PUBLICATIONS

Marcel Toele, "Multi-Language Software Development with DLX", Summer 2007, University of Amsterdam; <http://homepages.cwi.nl/~paulk/theses/MarcelToele.pdf>.*
Tom Arbuckle, "Measuring multi-language software evolution: a case study", Sep. 5, 2011, pp. 91-95; <http://dl.acm.org/citation.cfm?id=2024461>.*
Steve Vinoski, "Toward Integration Multilanguage Programming", May 2008, IEEE, pp. 83-85; <http://ieeexplore.ieee.org/stamp/stamp.jsp?tp=&arnumber=4510886 >.*

* cited by examiner

*Primary Examiner* — Thuy Dao
*Assistant Examiner* — Ben C Wang
(74) *Attorney, Agent, or Firm* — Yudell Isidore Ng Russell PLLC

(57) ABSTRACT

A method in a software development environment for developing product runtime code having at least two code components written in different runtime languages, the method comprising: providing a programming interface for development of the code components in a single development language: translating developed code components in the development language back to the respective runtime language for execution.

15 Claims, 4 Drawing Sheets

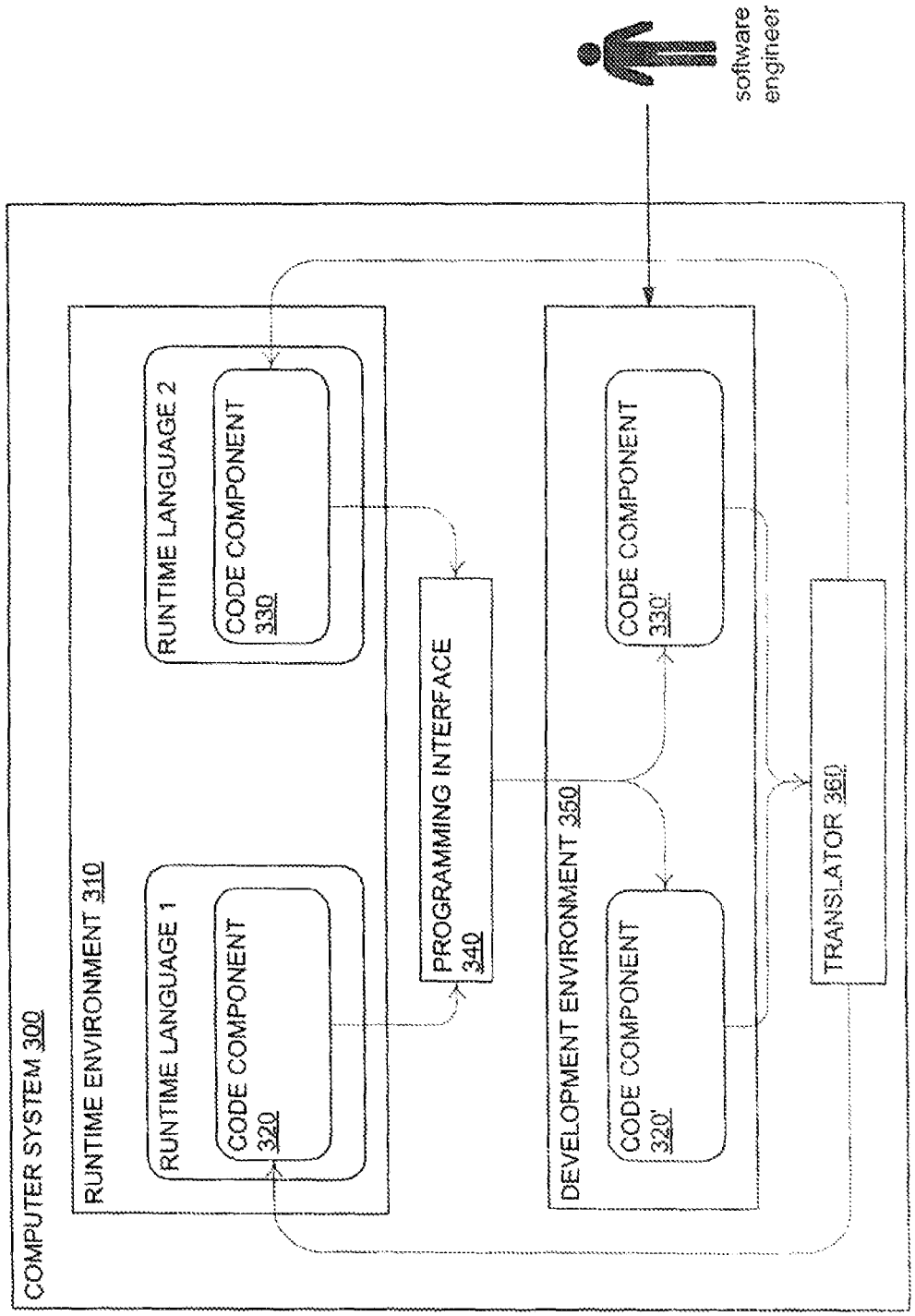

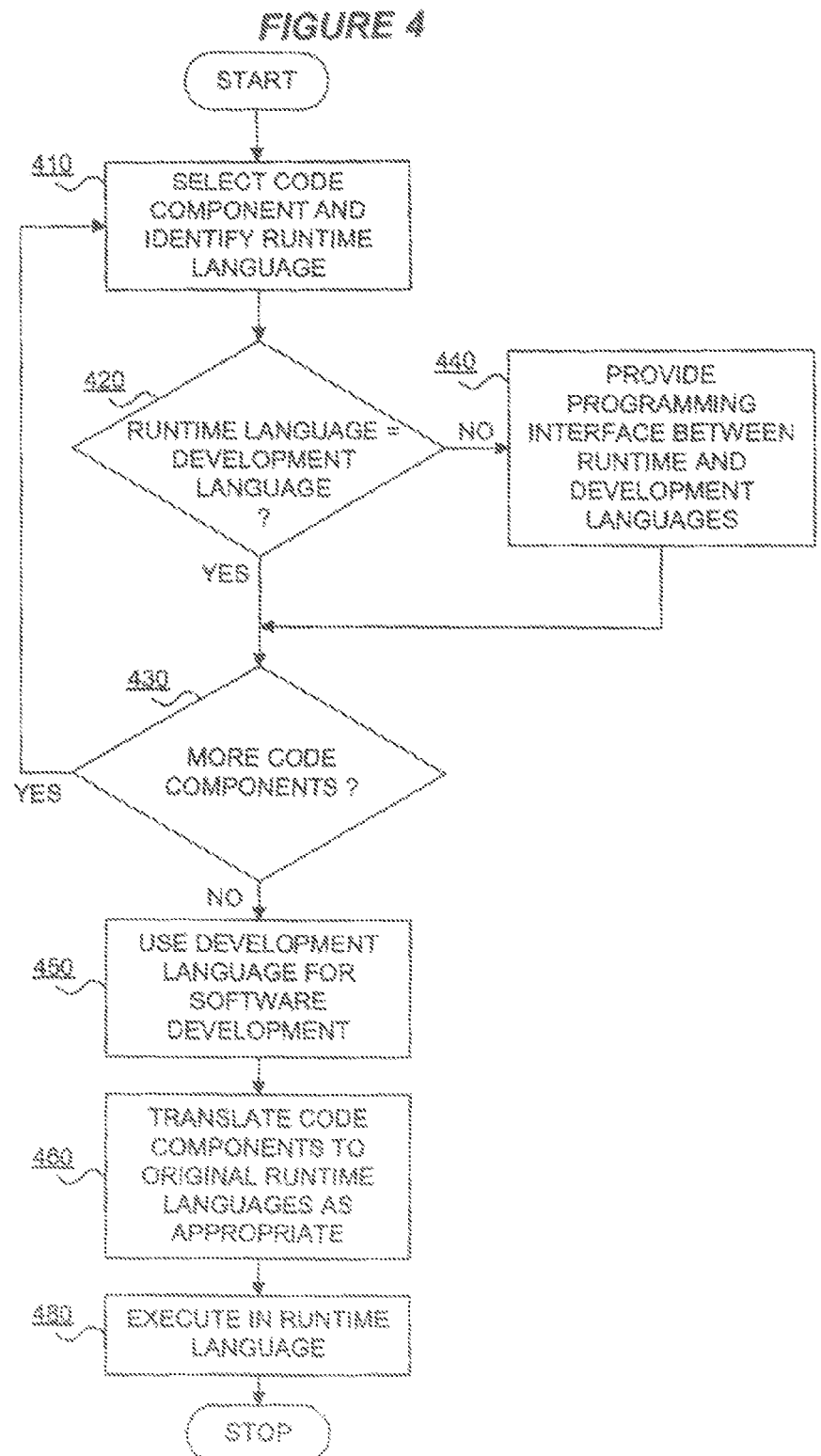

MULTI-LANGUAGE SOFTWARE DEVELOPMENT

FIELD OF THE INVENTION

The present invention relates generally to the field of computers and computer software and more particularly to a computer system and method for developing software.

BACKGROUND OF THE INVENTION

Systems management software programs provide enterprise-wide administration of computer systems. Systems management typically involves at least some of the following processes: storage management: security management: hardware and software inventories: server availability and monitoring: software installation; network capacity and monitoring; security and anti-virus: etc. For example the IBM Tivoli Management Framework is a known systems management platform whose architecture enables the platform to manage large numbers of remote devices and processes within a distributed computer system (IBM and Tivoli are trademarks of International Business Machines Corporation).

A number of Tivoli products which operate within the Tivoli Management Framework employ more than one technology and programming language. Examples of such products are: Tivoli Netcool Performance Manager Wireless (TNPMW) which provides performance metrics to manage all aspects of a service provider's wireless network infrastructure; Tivoli Netcool Service Quality Manager (TNSQM) which enables service providers to monitor and report on the service quality delivered to their end customers; and IBM Tivoli Network Manager (ITNM) (formerly Netcool/Precision) which monitors the network to locate and report on problems as they develop thereby enabling network staff/administrators to resolve problems before they escalate to impact availability and performance of business services. These products may also have their own bespoke programming languages as well.

Modification of these products, for example to customise, or extend the products, where the products include scripts, formulae, plug ins etc., requires development in different programming languages and possibly in their bespoke programming languages. For example, to integrate Netcool/Provisio to new technologies, it is necessary to employ the bespoke SNMP formula language (Simple Network Management Protocol is used in network management systems to monitor attached devices for conditions that may require administrator attention), the Complex Matrix Engine (CME) formula language or the ECMAScript (JavaScript/JScript). Each of these languages has its own syntax.

Currently there are a number of Integrated Development Environments (IDEs) such as Eclipse (www.eclipse.org) and Software Development Kits (SDKs) (such as the Java Development Kit from IBM) which integrate access to software code for rapid application development and testing of customisations and extensions to existing products (Eclipse is a trademark of The Eclipse Foundation and Java is a trademark of Sun Corporation).

There are a number of problems associated with customisation and/or extension of software products operating within a computer system. For some products, it is sometimes necessary to carry out several change tasks and frequently such tasks are related to other tasks in different software products in different programming languages. Also, the bespoke programming languages themselves may undergo changes and revisions over time. A software engineer or programmer must know multiple programming languages and the learning curve for a new language is very steep. Also IDEs and SDKs are tightly coupled to particular programming languages and environments. This means that in order to edit two software components in different languages a software engineer is required to use multiple IDEs or SDKs All of these problems increase the development complexity and the testing time significantly and have repercussions for all stages of software development including design and testing.

SUMMARY OF THE INVENTION

Accordingly, the present invention provides a method in a software development environment for developing product runtime code having at least two code components written in different runtime languages, the method comprising: providing a programming interface for development of the code components in a single development language; translating developed code components in the development language back to the respective runtime language for execution.

An advantage of this method is that a single IDE/SDK need be used. Software engineer/programmer productivity can be increased as time to learn different languages is reduced. This can speed time to market for new product features. Use of a single language for development which is then translated back into the programming language for deployment facilitates greater software code interchange between products. There is no need for cross-language interoperability layers.

Preferably, the programming interface provides the facilities of the runtime languages in the development language.

Preferably, the facilities include functions or methods or subroutines in the runtime languages.

Preferably, the programming interface is a Java native interface (JNI) and the development language is Java. Java is generally considered to be an easy language to use and has reduced debugging time.

Preferably, the development language is one of the runtime languages.

The present invention accordingly provides, in a second aspect, an apparatus for developing product runtime code having at least two code components composed in different runtime languages, the apparatus comprising: means for providing a programming interface for development of the code components in a single development language; and means for translating developed code components in the development language back to the respective runtime language for execution.

The present invention accordingly provides, in a third aspect, an apparatus comprising: a central processing unit; a memory subsystem; and input/output subsystem; and a bus subsystem interconnecting the central processing unit, the memory subsystem, the input/output subsystem: and the apparatus as described above.

The present invention accordingly provides, in a fourth aspect, a computer program element comprising computer program code to when loaded on a computer system and executed thereon, cause the computer to perform the steps of the method as described above.

BRIEF DESCRIPTION OF THE DRAWINGS

Embodiments of the present invention will now be described, by way of example only, with reference to the accompanying drawings in which:

FIG. 3 is a schematic diagram of an integrated development environment in accordance with a preferred embodiment of the present invention; and FIG. 4 shows a flowchart of a method for developing product runtime code in accordance with a preferred embodiment of the present invention;

DETAILED DESCRIPTION OF THE PREFERRED EMBODIMENTS

Figure 1:
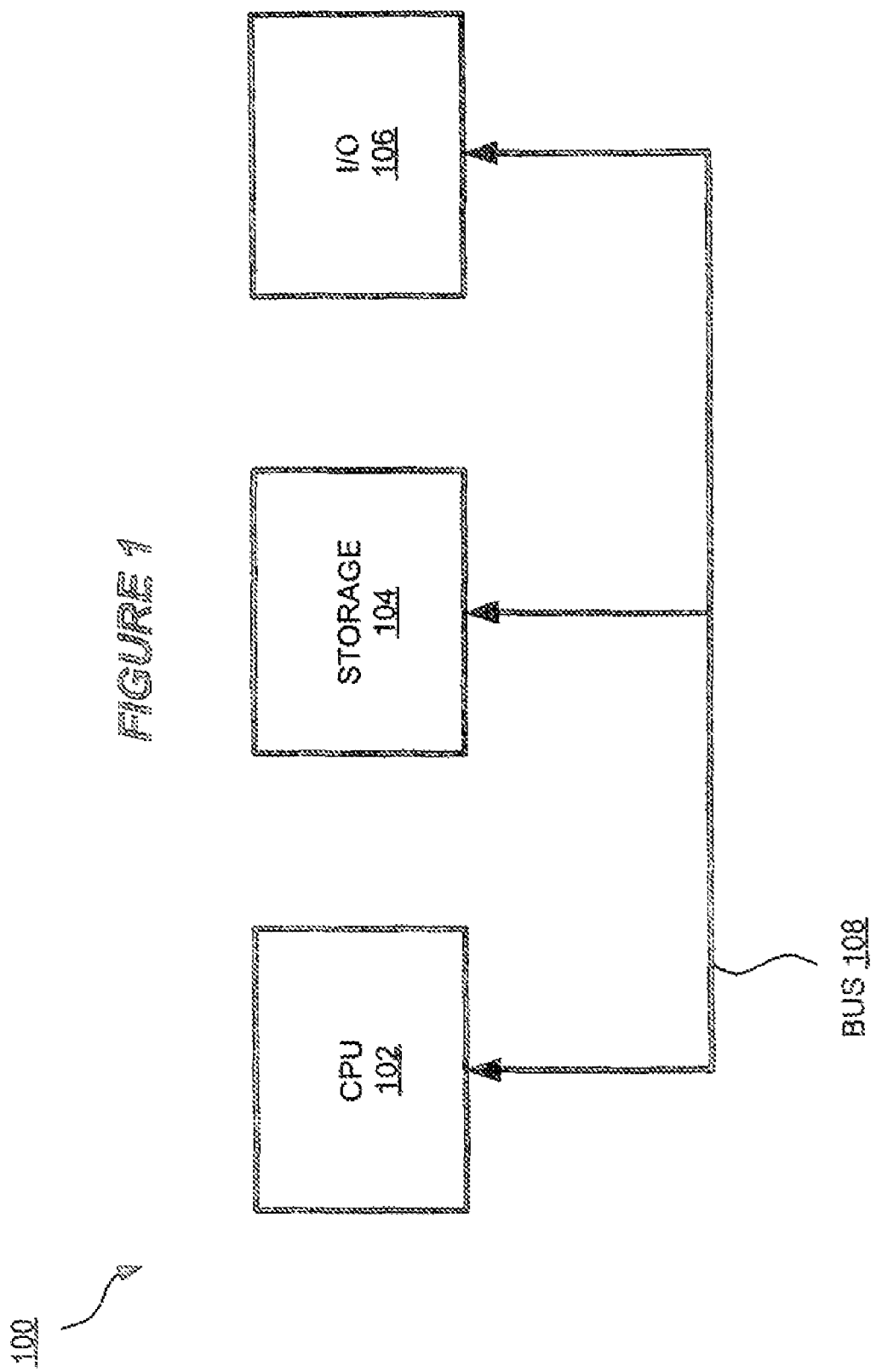
FIG. 1 is a block diagram of a computer system suitable for the embodiments of the present invention.

FIG. 1 is a block diagram of a computer system (100) suitable for the operation of embodiments of the present invention. A central processor unit (CPU) 102 is communicatively connected to storage 104 and an input/output (I/O) interlace 106 via a data bus 108. Storage 104 can be any read/write storage device such as random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, display (such as a monitor) and a network connection.

The present invention may also be embodied in a distributed computer system having more than one computer system 100, CPU 102 and more than one storage device 104. Such systems can carry out concurrent processes and run multiple processes. In distributed computer systems, programs may be split up into parts that can run simultaneously on multiple CPUs communicating over a network.

Figure 2:
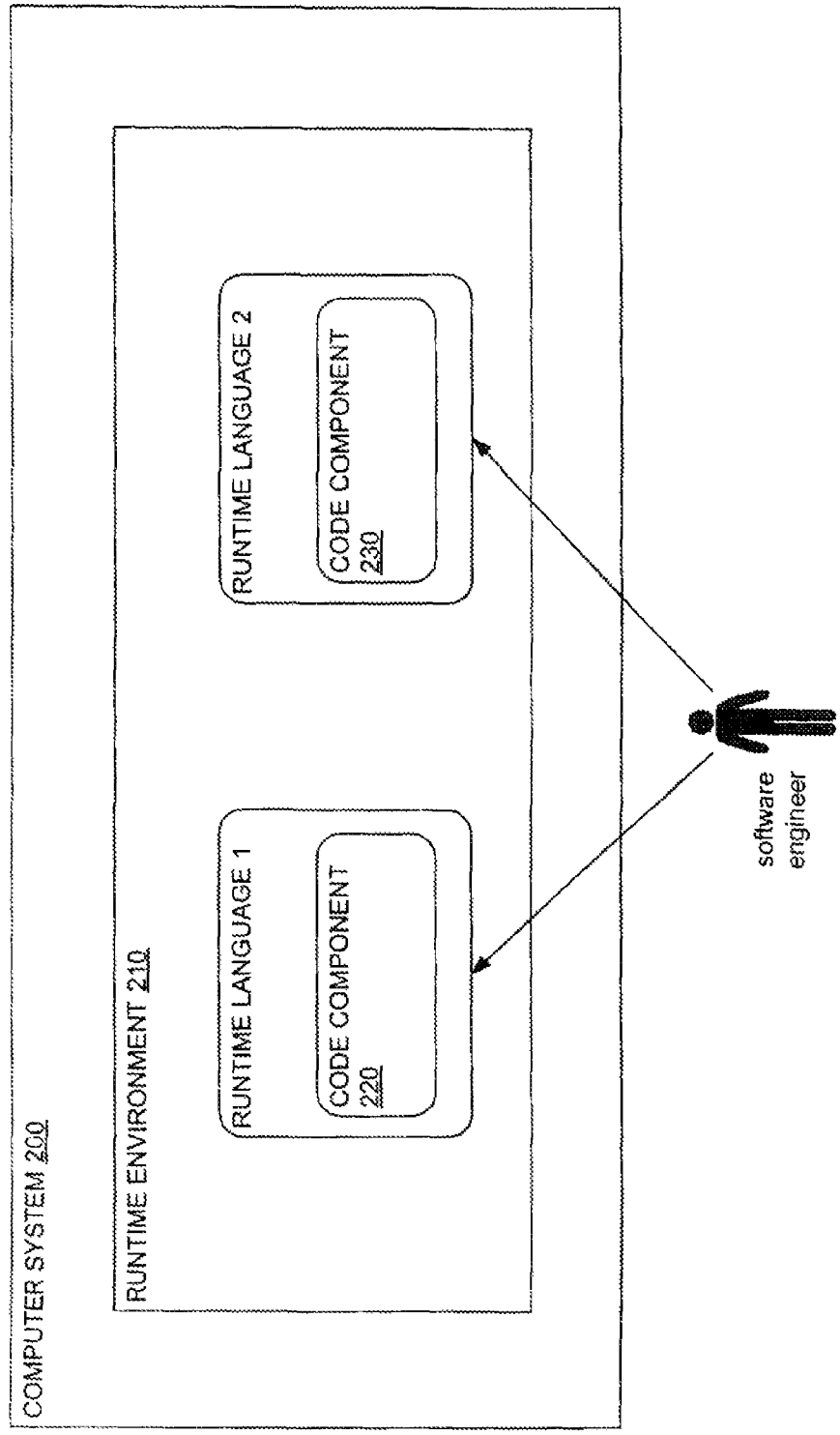
FIG. 2 is a schematic diagram of a prior art integrated development environment.

FIG. 2 is a schematic illustration of a computer system 200 for the execution and development of product runtime code. FIG. 2 includes product runtime code 210 having code component 220 and code component 230. Code components can include programs, modules, routines, software facilities, libraries and software objects. Code components 220 and 230 are written in different programming languages. For example, code component 220 is written in C++ and code component 230 is written in Java. The development and maintenance of the code components is undertaken with the help of an IDE and/or SDK. IDEs and SDKs provide facilities such as a source code editor, compiler, debugger, build tools and libraries to software engineers and programmers for software development. IDEs and SDKs are designed to increase engineer/programmer productivity, but even with their use engineers/programmers are required to have a detailed understanding of the relevant programming languages which can have very steep learning curves. Examples of IDEs include Eclipse from The Eclipse Foundation and Microsoft Visual Studio from Microsoft Corporation (Microsoft is a trademark of Microsoft Corporation). An example of an SDK is the Java Development Kit (JDK) from International Business Machines Corporation. Since code components 220 and 230 are written in different programming languages, programmers are required to be familiar with both C++ and Java in order to edit or make changes to or update product runtime code 210 as any changes made to one of the code components may need to be reflected in the other code component.

FIG. 3 shows a schematic diagram of a computer system 300 for the execution and development of product code in accordance with a preferred embodiment of the invention. Product runtime code 310 has code components 320 and 330 which have been written in different programming languages from each other. A programming interface 340 is provided to interpret code components 320 and 330 into code components 320' and 330' having the same development language as each other. The development language can be one of the programming languages of code components 320 or 330 or it can be a different programming language. For convenience and simplicity, only two code components have been shown in FIG. 3 but it will be appreciated that large numbers of code components written in various programming languages could be present 350 is a software development environment such as a software development kit (SDK) including development tools and other utilities for enabling a software engineer or programmer to develop or make changes to and update the code components. Software development environment 350 operates in the single development language. Thus a software engineer or programmer can make changes to code components 320' and 330' using the same development language. A translator 360 is provided for translating code components into their original runtime languages when the desired changes have been made to code component 320' and/or 330'. The code components can then be executed in their original runtime languages.

FIG. 4 is a flowchart of a method for developing product runtime code in a single development language in accordance with a preferred embodiment of the present invention. Initially at step 410 a first code component to be edited is selected and a runtime language for the selected component is identified. At step 420 a check is made to determine if the runtime language is the same as the development language. If the runtime language is the same as the development language then at step 430 a check is made for further code components which require development or change. Such code components are identified at the repetition of step 410. Returning to step 420, if it is determined for the selected code component that the runtime language is not the same as the development language, then at step 440, a programming interface between the runtime language and the development language is provided.

The programming interface provides all the functions of the runtime language for the selected code component in the software development environment 350 and in the development language. Functions which may be provided include routines, subroutines, branches, application programming interface functions, library functions, methods in an object oriented system, macros, procedures, scripts or other software facilities. In accordance with one embodiment of the invention, the programming interface is the Java Native Interlace (JNI), Programming interfaces such as JNI help a software engineer to modify a code component written in a runtime language to be accessible to programming languages such as Java. The programming interface (e.g. JNI) enables native program functions written in, for example, the C programming language to be exposed to, and called by a different development language. The programming interface may "wrap" functions in the runtime language for use in the development language. It may, alternatively or additionally, include a mapping between functions in the runtime language and the development language. It may also include a translator for identifying equivalent facilities in the runtime and development languages.

At step 450 development edits are made to the code components in the development language. A software development environment such an IDE or SDK made be utilised to develop, update and/or change code components.

At step 460 an edited/changed code component undergoes a translation in order to render it operable in the runtime language. The code component is then executed in the runtime language at step 480. Edited/changed code components having the same runtime and development languages have no need for the translation step 460 and they can be executed in the runtime language at step 480.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer-implemented method in a software development environment for developing product runtime code, the method comprising:
   identifying a first code component and a second code component, wherein the first code component is in a first runtime language, and wherein the second code component is in a second runtime language, wherein the first runtime language is different than the second runtime language;
   translating, by a programming interface, the first code component and the second code component into a common development language for development of the code components by:
   wrapping functions in the first code component in the first runtime language for use in the common development language, and
   wrapping functions in the second code component in the second runtime language for use in the common development language,
   wherein the programming interface includes a mapping between functions in the first and second runtime languages and the common development language;
   determining that the first code component and the second code component have been edited in the common development language; and
   translating the first edited code component from the common development language into the first runtime language, and the second edited code component into the second runtime language for execution.

2. The computer-implemented method of claim 1, wherein the programming interface provides facilities of the first runtime language and the second runtime language in the common development language.

3. The computer-implemented method of claim 2, wherein the facilities include functions in the first runtime language and the second runtime language.

4. The computer-implemented method of claim 1, wherein the programming interface is a Java native interface (JNI) and the common development language is Java.

5. The computer-implemented method of claim 1, wherein the common development language is one of the group consisting of the first runtime language and the second runtime language.

6. A system for developing product runtime code, the system comprising:
   at least one processor;
   a computer readable storage device coupled to the at least one processor; and
   a set of instructions stored in the computer readable storage device, wherein the set of instructions is executable by the processor to cause the processor to:
   identify a first code component and a second code component, wherein the first code component is in a first runtime language, and wherein the second code component is in a second runtime language, wherein the first runtime language is different than the second runtime language;
   translate, by a programming interface, the first code component and the second code component into a common development language for development of the code components by:
   wrapping functions in the first code component in the first runtime language for use in the common development language, and
   wrapping functions in the second code component in the second runtime language for use in the common development language,
   wherein the programming interface includes a mapping between functions in the first and second runtime languages and the common development language;
   determine that the first code component and the second code component have been edited in the common development language; and
   translate the first edited code component from the common development language into the first runtime language, and the second edited code component into the second runtime language for execution.

7. The system of claim 6, wherein the programming interface facilities of the first runtime language and the second runtime language in the common development language.

8. The system of claim 6, wherein the facilities include functions in the first runtime language and the second runtime language.

9. The system of claim 6, wherein the programming interface is a Java native interface (JNI) and the common development language is Java.

10. The system of claim 6, wherein the development language is one of the group consisting of the first runtime language and the second runtime language.

11. A computer-readable storage device having computer-readable instructions stored therein for developing product runtime code, the computer-readable instructions comprising instructions for:

identifying a first code component and a second code component, wherein the first code component is in a first runtime language, and wherein the second code component is in a second runtime language, wherein the first runtime language is different than the second runtime language;

translating, by a programming interface, the first code component and the second code component into a common development language for development of the code components by:

wrapping functions in the first code component in the first runtime language for use in the common development language, and wrapping functions in the second code component in the second runtime language for use in the common development language, wherein the programming interface includes a mapping between functions in the first and second runtime languages and the common development language;

determining that the first code component and the second code component have been edited in the common development language; and translating the first edited code component from the common development language into the first runtime language, and the second edited code component into the second runtime language for execution.

12. The computer-readable storage device of claim 11, wherein the programming interface provides facilities of the first runtime language and the second runtime language in the common development language.

13. The computer-readable storage device of claim 12, wherein the facilities include functions in the first runtime language and the second runtime language.

14. The computer-readable storage device medium of claim 11, wherein the programming interface is a Java native interface (JNI) and the common development language is Java.

15. The computer-readable storage device of claim 11, wherein the common development language is one of the group consisting of the first runtime language and the second runtime language.

* * * * *